US009436044B2

(12) United States Patent
Qu et al.

(10) Patent No.: US 9,436,044 B2
(45) Date of Patent: Sep. 6, 2016

(54) ARRAY SUBSTRATE, DRIVING METHOD OF ARRAY SUBSTRATE, AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Yingying Qu, Beijing (CN); Honglin Zhang, Beijing (CN); Dan Wang, Beijing (CN)

(73) Assignees: BOE TECHNOLOGY GROUP CO., LTD, Beijing (CN); BEIJING BOE DISLPLAY TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 14/429,105

(22) PCT Filed: Jul. 30, 2014

(86) PCT No.: PCT/CN2014/083352
§ 371 (c)(1),
(2) Date: Mar. 18, 2015

(87) PCT Pub. No.: WO2015/051663
PCT Pub. Date: Apr. 16, 2015

(65) Prior Publication Data
US 2016/0004127 A1    Jan. 7, 2016

(30) Foreign Application Priority Data

Oct. 9, 2013    (CN) .......................... 2013 1 0467672

(51) Int. Cl.
*H01L 29/04*    (2006.01)
*G02F 1/1343*    (2006.01)
(Continued)

(52) U.S. Cl.
CPC ....... *G02F 1/134309* (2013.01); *G02F 1/1368* (2013.01); *G02F 1/136286* (2013.01);
(Continued)

(58) Field of Classification Search
CPC .......................... H01L 27/1214; H01L 27/12
USPC .............................. 438/142; 257/72; 345/212
See application file for complete search history.

(56) References Cited

U.S. PATENT DOCUMENTS 7,403,252 B2    7/2008    Park et al.
7,830,485 B2    11/2010    You et al.
(Continued)

FOREIGN PATENT DOCUMENTS

CN        1621926 A       6/2005
CN      101196664 A       6/2008
(Continued)

OTHER PUBLICATIONS

International Search Report with Notice of Transmittal of the International Search Report of PCT/CN2014/083352 in Chinese, mailed Nov. 19, 2014.
(Continued)

*Primary Examiner* — Jami M Valentine
(74) *Attorney, Agent, or Firm* — Collard & Roe, P.C.

(57) ABSTRACT

Disclosed are an array substrate, a driving method of the array substrate, and a display device. The array substrate includes gate lines (12), data lines (11), and pixel units, each of the pixel units includes a common electrode (2, 3) and a pixel electrode (5). The common electrode (2, 3) includes a first common electrode (2) and a second common electrode (3). The first common electrode (2) includes a plurality of first strip electrodes and the second common electrode (3) includes a plurality of second strip electrodes. The first strip electrodes and the second strip electrodes are arranged alternately configured to form electrical fields with the pixel electrode (5) respectively. By disposing the first and second common electrodes forming multi-dimensional electric fields with the pixel electrode respectively, the transmittance of the display device is improved.

19 Claims, 6 Drawing Sheets

(51) Int. Cl.
*G09G 3/36* (2006.01)
*G02F 1/1362* (2006.01)
*G02F 1/1368* (2006.01)
*G02F 1/1333* (2006.01)

(52) U.S. Cl.
CPC .............. *G09G3/36* (2013.01); *G09G 3/3696* (2013.01); *G02F 1/133345* (2013.01); *G02F 2001/134318* (2013.01); *G02F 2001/134381* (2013.01); *G02F 2201/121* (2013.01); *G02F 2201/124* (2013.01); *G09G 2300/0426* (2013.01)

(56) References Cited

U.S. PATENT DOCUMENTS

| | | | |
|---|---|---|---|
| 8,345,207 | B2 | 1/2013 | Chung et al. |
| 8,780,308 | B2 | 7/2014 | Li et al. |
| 8,963,174 | B2 * | 2/2015 | Li ................... G02F 1/136286 257/59 |
| 9,147,697 | B2 * | 9/2015 | Lee ................... H01L 27/1288 |
| 2001/0043303 | A1 | 11/2001 | Shibahara et al. |
| 2004/0263749 | A1 | 12/2004 | Jeong et al. |
| 2013/0043477 | A1 | 2/2013 | Jang et al. |
| 2013/0242222 | A1 | 9/2013 | Nishida et al. |
| 2014/0054626 | A1 * | 2/2014 | Lee ................... H01L 27/1288 257/91 |
| 2014/0054630 | A1 * | 2/2014 | Li ................... G02F 1/136286 257/91 |
| 2014/0063387 | A1 | 3/2014 | Gu |
| 2014/0132907 | A1 | 5/2014 | Qin et al. |
| 2014/0146264 | A1 * | 5/2014 | Hao ................... G02F 1/134363 349/47 |
| 2015/0236043 | A1 * | 8/2015 | Shi ................... H01L 27/1259 257/390 |
| 2015/0316817 | A1 * | 11/2015 | Choi ................... G02F 1/1334 349/86 |

FOREIGN PATENT DOCUMENTS

| | | |
|---|---|---|
| CN | 102169259 A | 8/2011 |
| CN | 102621757 A | 8/2012 |
| CN | 102749767 A | 10/2012 |
| CN | 102955301 A | 3/2013 |
| CN | 102981320 A | 3/2013 |
| CN | 103018986 A | 4/2013 |
| CN | 103163704 A | 6/2013 |
| CN | 103488008 A | 1/2014 |
| CN | 203519981 U | 4/2014 |

OTHER PUBLICATIONS

Written Opinion of the International Searching Authority of PCT/CN2014/083352 in Chinese with English translation mailed Nov. 19, 2014.
First Chinese Office Action of Chinese Application No. 201310467672.9, mailed Jul. 20, 2015 with English translation.
Second Chinese Office Action of Chinese Application No. 201310467672.9, mailed Nov. 9, 2015 with English translation.

* cited by examiner

ARRAY SUBSTRATE, DRIVING METHOD OF ARRAY SUBSTRATE, AND DISPLAY DEVICE

CROSS REFERENCE TO RELATED APPLICATIONS

This application is the National Stage of PCT/CN2014/083352 filed on Jul. 30, 2014, which claims priority under 35 U.S.C. §119 of Chinese Application No. 201310467672.9 filed on Oct. 9, 2013, the disclosure of which is incorporated by reference.

TECHNICAL FILED

Embodiments of the present invention relate to an array substrate, a driving method of array substrate, and a display device.

BACKGROUND

With constant development of LC display technology, people have more and more strict requirement on a resolution of LC display products. For conventional LC display technology such as ADS (Advanced Super Dimension Switch) technology, it has a transmittance of only about 78% of that of TN (Twisted Nematic) mode, thus it appears particularly important to improve the transmittance of a LC display of ADS mode.

FIG. 1 is a schematic diagram illustrating a structure of an array substrate in a LC display panel of ADS mode. The substrate 1 includes a pixel electrode 5, a common electrode 6 and a passivation layer 7. The common electrode 6 and the pixel electrode 5 are designed in a form of slit like on the substrate 1. As shown in FIG. 2, LC molecules are driven to rotate under the effect of an electric field generated between the slit-like common electrode 6 and pixel electrode 5, which allows a transmittance of the display panel and a distribution of the LC molecules to be as the situation shown in FIG. 2 to achieve its display function.

SUMMARY

An aspect of the present invention provides an array substrate, including gate lines, data lines, and a plurality of pixel units defined by the gate lines and the data lines, each of the plurality pixel units includes a common electrode and a pixel electrode. The common electrode and the pixel electrode are located at different film layers and are insulated from each other by an insulating layer. The common electrode includes a first common electrode connected to a first common electrode line and a second common electrode connected to a second common electrode line. The first common electrode and the second common electrode are both slit electrode and include a plurality of first strip electrodes and a plurality of second strip electrodes respectively, and the first strip electrodes and the second strip electrodes are arranged alternately with each other, configured to form electrical fields with the pixel electrode respectively.

In an example, the pixel electrode is a slit electrode and includes a plurality of third strip electrodes; the third strip electrodes of the pixel electrode are arranged alternately with the first strip electrodes of the first common electrode and with the second strip electrodes of the second common electrode; the third strip electrodes of the pixel electrode is arranged alternatively between the first strip electrodes of the first common electrode and the second strip electrodes of the second common electrode that are adjacent to each other.

In an example, the first common electrode and the second common electrode are located in a same film layer; the first common electrode and the second common electrode both are located at a side of the pixel electrode that is away from a substrate of the array substrate, or, the first common electrode and the second common electrode both are located at a side of the pixel electrode that faces the substrate of the array substrate.

In an example, the first common electrode and the second common electrode are located at different film layers; the first common electrode and the second common electrode both are located at a side of the pixel electrode that is away from a substrate of the array substrate, or, the first common electrode and the second common electrode both are located at a side of the pixel electrode that faces the substrate of the array substrate, or, the first common electrode is located at a side of the pixel electrode that is away from a substrate of the array substrate and the second common electrode is located at a side of the pixel electrode that faces the substrate of the array substrate.

In an example, a distance between projections of the first strip electrodes of the first common electrode and the second strip electrodes of the second common electrode on the substrate, which are adjacent to each other, is larger than a width of the third strip electrodes of the pixel electrode.

In an example, a distance between the first strip electrodes of the first common electrode and the third strip electrodes of the pixel electrode in a direction parallel to the array substrate is 0~0.6 µm; a distance between the second strip electrodes of the second common electrode and the third strip electrodes of the pixel electrode in a direction parallel to the array substrate is 0~0.6 µm; each of the first strip electrodes, the second strip electrodes and the third strip electrodes has a width of 2~2.6 µm.

In an example, the pixel electrode is a plate-like electrode; the first common electrode and the second common electrode both are located at a same layer or different layers at a side of the pixel electrode that is away from a substrate of the array substrate.

Another aspect of the present invention provides a display device including any of the above array substrates.

Yet another aspect of the present invention provides a method of driving the array substrate as described; the method includes applying a first common voltage to the first common electrode through the first common electrode line; and applying a second common voltage to the second common electrode through the second common electrode line, wherein the second common voltage is different from the first common voltage.

In an example, the method further includes providing a pixel voltage signal to the pixel electrode through a data line, wherein the pixel voltage signal is set between the first common voltage and the second common voltage.

DETAILED DESCRIPTION

In order to make objects, technical details and advantages of the embodiments of the invention apparent, technical solutions according to the embodiments of the present invention will be described clearly and thoroughly as below in conjunction with the accompanying drawings of embodiments of the present invention. It is apparent that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

Figure 1:
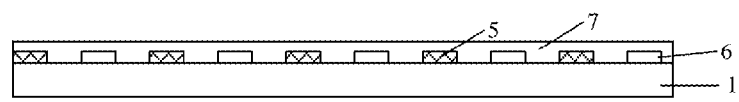
FIG. 1 is a schematic structural diagram of an array substrate in a LCD device.
Figure 2:
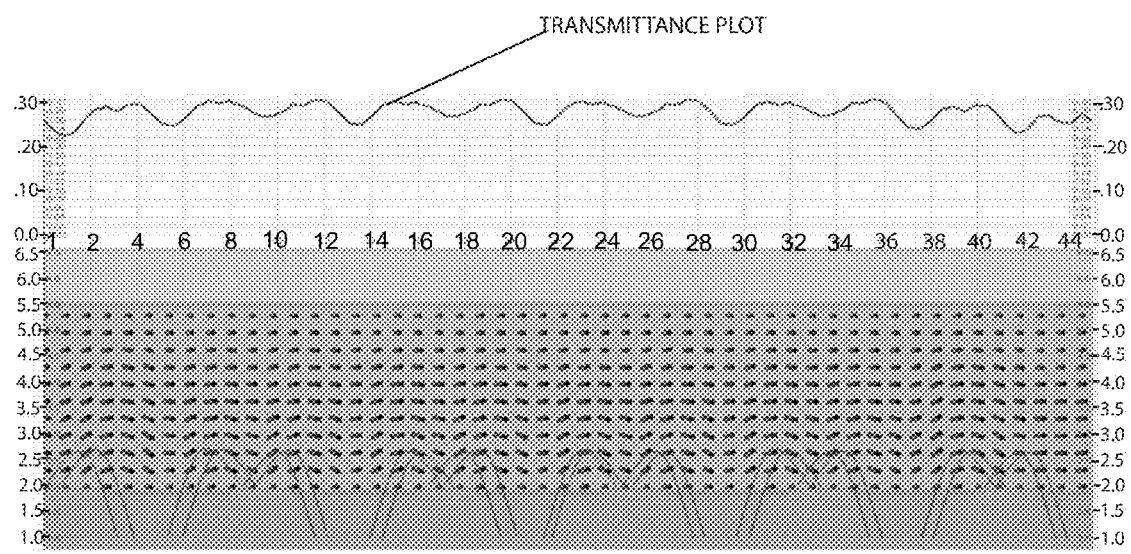
FIG. 2 is a simulation diagram illustrating a light transmittance of a LCD device.

The inventors notice that a light transmittance of LC panel in the array substrate shown in FIG. 1 and FIG. 2 is not quite high due to the same voltage of common electrodes in the array substrate.

A First Embodiment

Figure 3:
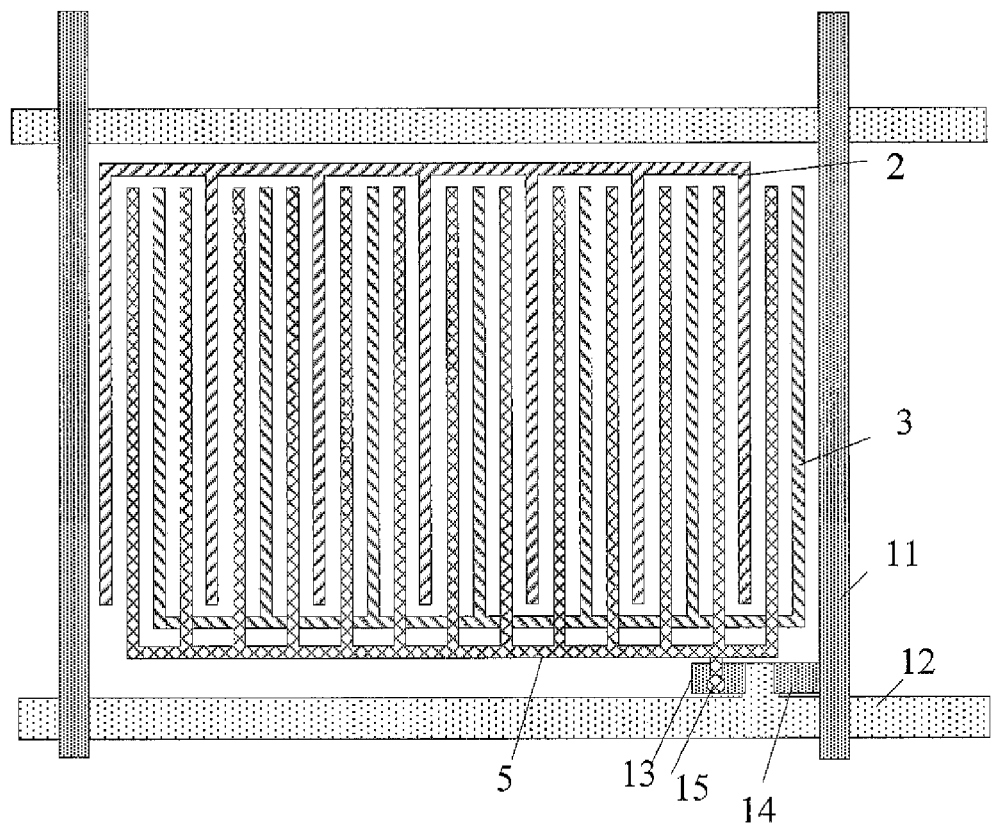
FIG. 3 is a plan view illustrating a structure of an exemplary array substrate as provided by a first embodiment of the present invention.
Figure 4:
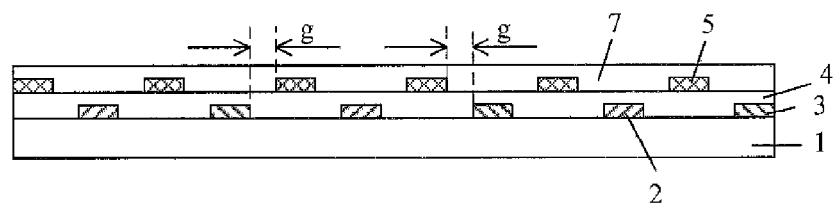
FIG. 4 is a sectional view of an exemplary array substrate as provided by a first embodiment of the present invention.

The present embodiment provides an array substrate as shown in FIG. 3 and FIG. 4. FIG. 3 is a schematic diagram illustrating a pixel unit on the array substrate, and FIG. 4 is a sectional view of the array substrate in FIG. 3. The array substrate includes gate lines 12 and data lines 11 which are formed on a substrate 1, and a plurality of pixel units defined by the gate lines 12 and the data lines 11; each of the pixel units includes common electrodes 2, 3 and a pixel electrode 5; the pixel electrode 5 and the common electrodes 2, 3 are formed at different film layers of the array substrate and are insulated from each other by an insulating layer.

The common electrodes 2, 3 include a first common electrode 2 and a second common electrode 3 which are configured to be connected to different signal lines respectively and both are slit electrode. The first common electrode 2 includes a plurality of first strip electrodes, the second common electrode 3 includes a plurality of second strip electrodes, and the first strip electrodes are arranged alternately with the second strip electrodes to form multi-dimensional electric fields with the pixel electrode 5 respectively. The pixel electrode 5 is connected to a drain electrode 13 of a TFT through a via hole 15, a source electrode 14 of the TFT is connected to the data line 11, and a gate electrode of the TFT is connected to the gate line 12. A surface of the pixel electrode 5 may be further covered with a passivation layer 7.

In the present embodiment, the pixel electrode 5 is a slit electrode. The pixel electrode 5 includes a plurality of third strip electrodes; the third strip electrodes of the pixel electrode 5 are arranged alternately with the first strip electrodes of the first common electrode 2 and with the second strip electrodes of the second common electrode 3; the third strip electrodes of the pixel electrode 5 are arranged alternately between the first strip electrodes of the first common electrode 2 and the second strip electrodes of the second common electrode 3 that are adjacent to each other.

The first common electrode 2 and the second common electrode 3 are located at a same film layer; the first common electrode 2 and the second common electrode 3 both are located at a side of the pixel electrode 5 that is away from a substrate of the array substrate, or, the first common electrode 2 and the second common electrode 3 both are located at a side of the pixel electrode 5 that faces the substrate of the array substrate.

As shown in FIG. 4, the first common electrode 2 and the second common electrode 3 are located at a same layer which is different from a layer of the pixel electrode 5; and the first common electrode 2 and the second common electrode 3 both are located at a side of the pixel electrode 5 that faces the substrate of the array substrate. The pixel electrode 5 in FIG. 4 is located over the first common electrode 2 and the second common electrode 3. The first common electrode 2, the second common electrode 3 and the pixel electrode 5 are all slit electrodes. The third strip electrode of the pixel electrode 5, the first strip electrode of the first common electrode 2 and the second strip electrode of the second common electrode 3 are arranged alternately, and the third strip electrodes of the pixel electrode 5 are arranged alternately between the first strip electrodes of the first common electrode 2 and the second strip electrodes of the second common electrode 3 that are adjacent to each other. A distance between projections of the first strip electrodes of the first common electrode 2 and the second strip electrodes of the second common electrode 3 on the substrate 1, which are adjacent to each other, is larger than a width of the third strip electrodes of the pixel electrode 5. In this way, a transverse electric filed is generated between the first common electrode 2 and the second common electrode 3, a multi-dimensional electric filed is generated between the pixel electrode 5 and the first common electrode 2, and a multi-dimensional electric filed is generated between the pixel electrode 5 and the second common electrode 3. When a resultant electric field of the transverse electric field and these two multi-dimensional electric fields drives LC molecules rotate to a same direction in the horizontal direction, a horizontally rotational angle of the LC molecule is increased. For the electric fields generated by the pixel electrode 5 with the first common electrode 2 and the second common electrode 3 respectively being uniformly distributed, for example, the first common electrode 2, the second common electrode 3 and the pixel electrode 5 are spaced at an equal distance g and all of them have a same width; for example, 0<g<0.6 µm, and the width is 2.6 µm.

During operation, the first common electrode 2 and the second common electrode 3 are connected to different signal lines so as to be applied with different voltages. In the present embodiment, in order to drive the LC molecules to rotate sufficiently in horizontal direction, the first common electrode 2 and the second common electrode 3 have different polarities; that is, the voltage of the first common electrode 2 has a positive polarity and the voltage of the second common electrode 3 has a negative polarity (vice versa). The voltage of the pixel electrode 5 may be set between the voltage of the first common electrode 2 and the voltage of the second common electrode 3. For example, the voltage $V_{com1}$ of the first common electrode 2 and the voltage $V_{com2}$ of the second common electrode 3 have equal absolute values, the voltage of the first common electrode 2 has a positive polarity, the voltage of the second common electrode 3 has a negative polarity, the voltage $V_{pixel}$ of the pixel electrode 5 is set between $V_{com1}$ and $V_{com2}$, and $V_{com1}=-V_{com2}$, $|V_{com1}-V_{pixel}|=|V_{pixel}-V_{com2}|$, where $0.2V<V_{com1}<0.3V$, $-0.2V<V_{com2}<-0.3V$.

Figure 5:
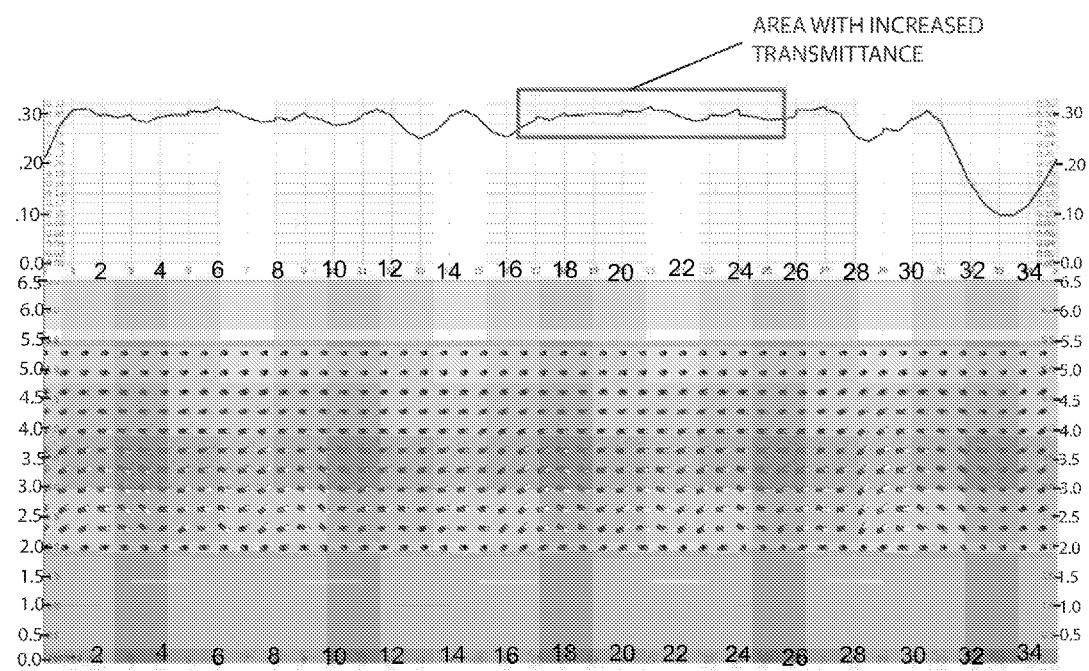
FIG. 5 is a simulation diagram illustrating a light transmittance as provided by a first embodiment of the present invention.

FIG. 5 is a simulation diagram illustrating a light transmittance of the array substrate in FIG. 4. The first common electrode and the second common electrode generate multi-dimensional electric fields with the pixel electrode respectively, so as to drive the LC molecules located over the pixel electrode to rotate sufficiently in horizontal direction, which improves the transmittance.

Figure 6:
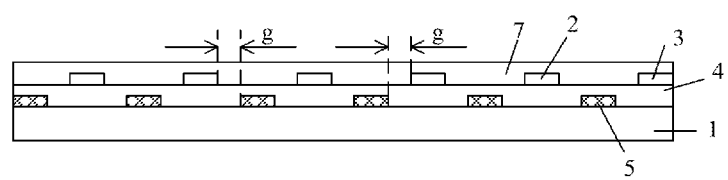
FIG. 6 is a sectional view of another exemplary array substrate as provided by a first embodiment of the present invention.

FIG. 6 illustrates a structure of another array substrate of the present embodiment, wherein the first common electrode 2 and the second common electrode 3 are located at a same layer, which is different from a layer of the pixel electrode 5, and the first common electrode 2 and the second common electrode 3 both are located a side of the pixel electrode 5 that is away from the substrate of the array substrate. With respect to the structure as shown in FIG. 5, the pixel electrode 5 in FIG. 6 is located beneath the first common electrode 2 and the second common electrode 3. For the array substrate shown in FIG. 6, the first common electrode 2 and the second common electrode 3 generate a transverse electric field there-between, the pixel electrode 5 and the first common electrode generate a multi-dimensional electric filed, and the pixel electrode 5 and the second common electrode 3 generate a multi-dimensional electric field; the array substrate in FIG. 6 can achieve substantially same technical effect as that of the array substrate in FIG. 4, thus the details are omitted herein.

The array substrate as provided by the present embodiment is an ADS mode using the in-plane-electric-field based broad view-angle technology, which forms a multi-dimensional electric field from an electric field generated by edges of slit electrodes in a same plane and an electric field generated between a slit electrode layer and a plate electrode layer, so as to drive LC molecules with various orientations located between and directly over the electrodes within a LC cell to rotate, thereby improving the working efficiency of LC and increasing the transmittance.

A Second Embodiment

Figure 7:
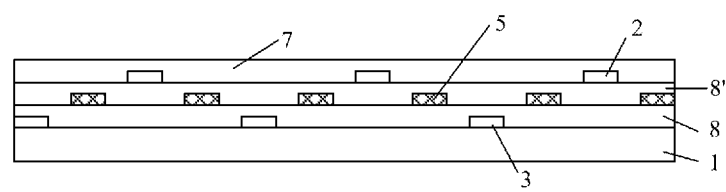
FIG. 7 is a sectional view of an exemplary array substrate as provided by a second embodiment of the present invention.
Figure 8:
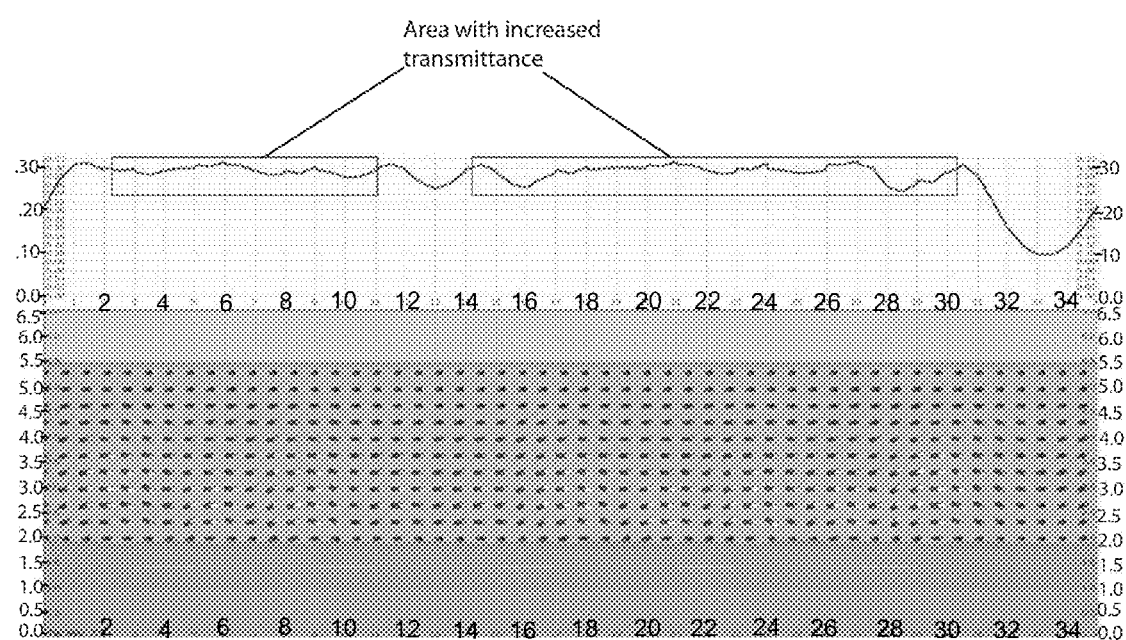
FIG. 8 is a simulation diagram illustrating a light transmittance as provided by a second embodiment of the present invention.

FIG. 7 is a schematic view illustrating a structure of an exemplary array substrate as provided by the present embodiment. The pixel electrode 5, the first common electrode 2 and the second common electrode 3 are all slit electrodes and located at different layers. The first common electrode 2 is located at a side of the pixel electrode 5 that is away from the substrate 1 of the array substrate, and the second common electrode 3 is located at a side of the pixel electrode 5 that faces the substrate 1 of the array substrate. In FIG. 7, the first common electrode 2 is located over the substrate 1, the pixel electrode 5 is located at a layer between the layer of the first common electrode 2 and the layer of the second electrode 3; the pixel electrode 5 is spaced from the first common electrode 2 by an insulating layer 8 and is spaced from the second common electrode 3 by an insulating layer 8', respectively. A passivation layer 7 is further formed over the second common electrode 3. The array substrate as shown in FIG. 7 is operated with the principle that the first common electrode 2 and the second common electrode 3 generate multi-dimensional electric fields with the pixel electrode 5 respectively, and the first common electrode 2 and the second common electrode 3 further generate a multi-dimensional electric field there-between; when a resultant electric field of these three multi-dimensional electric fields drives the LC molecules to rotate to a same direction in the horizontal direction, a horizontally rotational angle of the LC molecule is increased. The technical effect as obtained is shown in FIG. 8, wherein the LC molecules located over the pixel electrode are driven to rotate sufficiently in the horizontal direction, which improves the transmittance.

Figure 9:
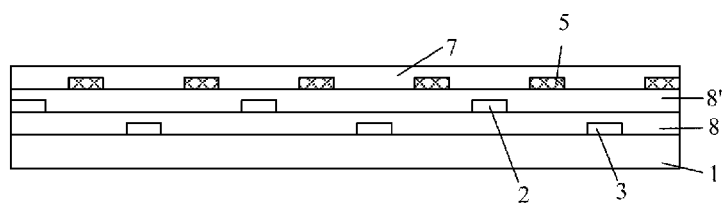
FIG. 9 is a sectional view of another exemplary array substrate as provided by a second embodiment of the present invention.

FIG. 9 is a schematic structural view of another exemplary array substrate as provided by the present embodiment. The pixel electrode 5, the first common electrode 2 and the second common electrode 3 are all slit electrodes and located at different layers. The first common electrode 2 and the second common electrode 3 both are located at a side of the pixel electrode 5 that faces the substrate 1 of the array substrate. In FIG. 9, the second common electrode 3 is located on the substrate 1, the first common electrode 2 is located at a layer between the layer of the pixel electrode 5 and the layer of the second electrode 3. The first common electrode 2 is spaced from the second common electrode 3 by an insulating layer 8, and is spaced from the pixel electrode 5 by an insulating layer 8'. A passivation layer 7 is further formed on the pixel electrode 5. In the array substrate as shown in FIG. 9, the first common electrode 2 and the second common electrode 3 generate multi-dimensional electric fields with the pixel electrode 5 respectively, and the first common electrode 2 and the second common electrode 3 further generate a multi-dimensional electric field there-between; when a resultant electric field of these three multi-dimensional electric fields drives the LC molecules to rotate to a same direction in the horizontal direction, a horizontally rotational angle of the LC molecule is increased. The technical effect as obtained is shown in FIG. 10, wherein the LC molecules located over the pixel electrode are driven to rotate sufficiently in the horizontal direction, which improves the transmittance.

Figure 11:
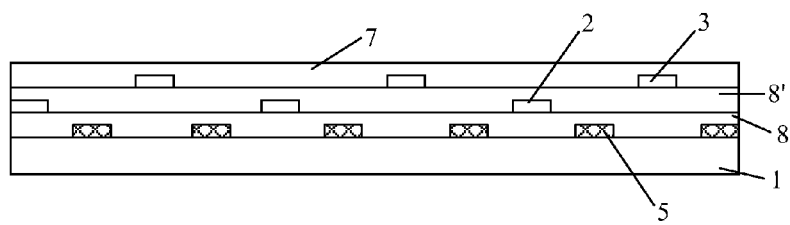
FIG. 11 is a sectional view of yet another exemplary array substrate as provided by a second embodiment of the present invention.

FIG. 11 is a schematic diagram illustrating a structure of another exemplary array substrate as provided by the present embodiment. The pixel electrode 5, the first common electrode 2 and the second common electrode 3 are all slit electrodes and located at different layers; the first common electrode 2 and the second common electrode 3 both are located at a side of the pixel electrode 5 that is away from the substrate 1 of the array substrate. In FIG. 11, the pixel electrode 5 is located on the substrate 1, and the first common electrode 2 is located at a layer between the layer of the pixel electrode 5 and the layer of the second electrode 3. The first common electrode 2 is spaced from the pixel electrode 5 by an insulating layer 8 and is spaced from the second common electrode 3 by an insulating layer 8'. A passivation layer 7 is further formed on the second common electrode 3. In the array substrate as shown in FIG. 11, the first common electrode 2 and the second common electrode 3 generate multi-dimensional electric fields with the pixel electrode 5 respectively, and the first common electrode 2 and the second common electrode 3 further generate a multi-dimensional electric field there-between. The technical effect as obtained by this array substrate is substantially the same as that of the array substrate as shown in FIG. 9, thus the details are not described herein any more.

Figure 10:
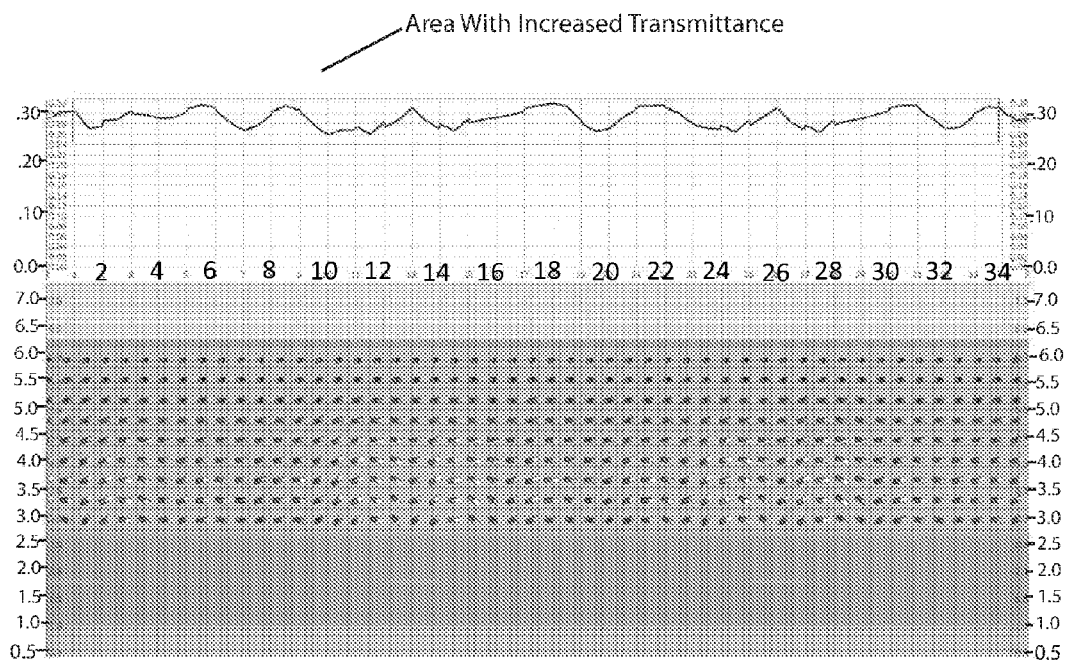
FIG. 10 is a simulation diagram illustrating a light transmittance as provided by a second embodiment of the present invention.

Besides, when the first common electrode 2, the second common electrode 3 and the pixel electrode 5 are located at different layers, substantially the same technical effects are obtained with the first common electrode 2 and the second common electrode 3 in FIGS. 7, 9 and 10 interchanging their locations, thus the details are not described any more herein.

In the above examples, a distance between projections of the first strip electrodes of the first common electrode 2 and the second strip electrodes of the second common electrode 3 on the substrate 1, which are adjacent to each other, is larger than a width of the third strip electrodes of the pixel electrode 5. A distance between the first strip electrodes of the first common electrode 2 and the third strip electrodes of the pixel electrode 5 in a direction parallel to the array substrate is 0~0.6 µm. A distance between the second strip electrodes of the second common electrode 3 and the third strip electrodes of the pixel electrode 5 in a direction parallel to the array substrate is 0~0.6 µm. The distance between the first strip electrodes of the first common electrode 2 and the third strip electrodes of the pixel electrode 5 in a direction parallel to the array substrate is equal to the distance between the second strip electrodes of the second common electrode 3 and the third strip electrodes of the pixel electrode 5 in a direction parallel to the array substrate. Each of the first strip electrodes, the second strip electrodes and the third strip electrodes has a width of 2~2.6 µm.

A Third Embodiment

Figure 12:
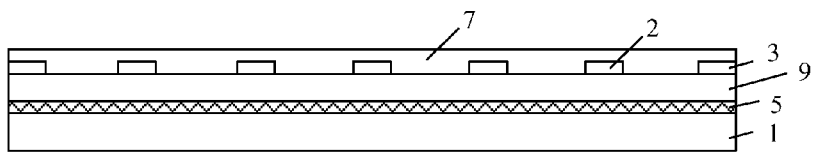
FIG. 12 is a sectional view of an exemplary array substrate as provided by a third embodiment of the present invention.

The present embodiment provides an array substrate. FIG. 12 is a schematic diagram illustrating a structure of an exemplary array substrate as provided by the present embodiment, the array substrate includes a pixel electrode 5 (plate electrode) and common electrodes 2, 3 (slit electrodes) formed on the substrate 1. The common electrodes include a first common electrode 2 and a second common electrode 3 which are connected to different signal lines respectively. The first common electrode 2 is connected to a first common electrode line, and the second common electrode 3 is connected to a second common electrode line. The first common electrode 2 and the second common electrode 3 are both slit electrodes and are arranged alternately. The common electrodes are spaced from the pixel electrode 5 by an insulating layer 9, configured to form multi-dimensional electric fields with the pixel electrode 5 respectively. Surfaces of the first common electrode 2 and of the second common electrode 3 are further covered with a passivation layer 7.

The pixel electrode 5 is a plate electrode formed on the substrate 1. The first common electrode 2 and the second common electrode 3 both are located above the pixel electrode 5.

As shown in FIG. 12, the first common electrode 2 and the second common electrode 3 are distributed in a same layer and both are formed over the insulating layer 9. The pixel electrode 5 and the first common electrode 2 generate a multi-dimensional electric field there-between, the pixel electrode 5 and the second common electrode 3 generate a multi-dimensional electric field there-between, and the first common electrode 2 and the second common electrode 3 further generate a transverse electric filed there-between, so as to enhance the multi-dimensional electric field by superposing a plurality of multi-dimensional electric fields in the same layer or different layers, so that the LC molecules located over the pixel electrode 5 are driven to rotate sufficiently in the horizontal direction, which improves the transmittance.

Figure 13:
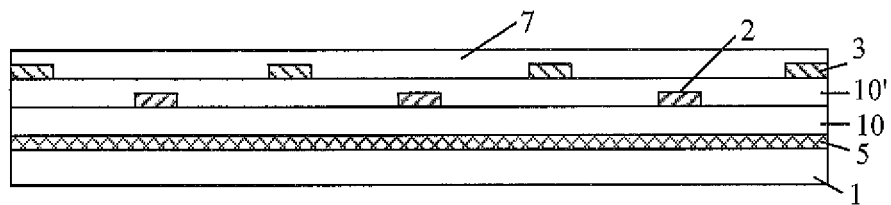
FIG. 13 is a sectional view of another exemplary array substrate as provided by a third embodiment of the present invention.

FIG. 13 is a schematic diagram illustrating a structure of yet another exemplary array substrate as provided by the present embodiment. With respect to the array substrate as shown in FIG. 12, the first common electrode 2 and the second common electrode 3 are distributed in different layers and both located over the pixel electrode 5. The first common electrode 2 and the second common electrode 3 both are slit electrode, and the pixel electrode 5 is a plate electrode. The pixel electrode 5 and the first common electrode 2 are spaced by an insulating layer 10, and the first common electrode 2 and the second common electrode 3 are spaced by an insulating layer 10'. The second common electrode 3 is further covered with a passivation layer 7 thereon. For the array substrate as shown in FIG. 13, the pixel electrode 5 and the first common electrode 2 generate a multi-dimensional electric field there-between, the pixel electrode 5 and the second common electrode 3 generate a multi-dimensional electric field there-between, and the first common electrode 2 and the second common electrode 3 can also generate a multi-dimensional electric field there-between, so as to enhance the multi-dimensional electric field by superposing a plurality of multi-dimensional electric fields in the same layer or different layers, so that the LC molecules located over the pixel electrode 5 are driven to rotate sufficiently in the horizontal direction, which improves the transmittance.

The array substrates as shown in FIG. 12 and FIG. 13 operate with the same principle as that of the array substrate of the first embodiment as shown in FIG. 4 and can achieve similar technical effects, thus the details are not described herein any more.

A Fourth Embodiment

Figure 14:
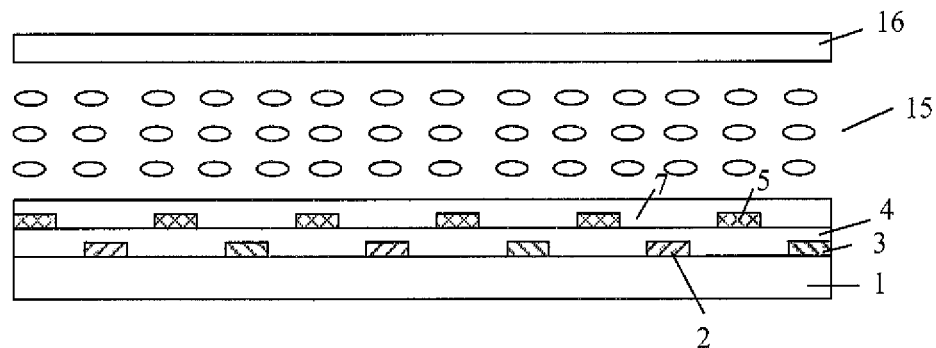
FIG. 14 is a sectional view of an exemplary array substrate as provided by a fourth embodiment of the present invention.

The present embodiment also provides a display device. FIG. 14 is a schematic diagram illustrating a structure of an exemplary LC display device as provided by an embodiment of the present invention, including, a LC layer 15, a color filter substrate 16 and an array substrate as provided by any of the embodiments above. Simulation diagrams of the light transmittance of such LC display device are shown in FIG. 5, FIG. 8 or FIG. 10. The display device can be any products or components having display functions, such as LC panel, electronic paper, mobile phone, tablet computer, TV, display, laptop, digital photo frame and navigator.

A Fifth Embodiment

Figure 15:
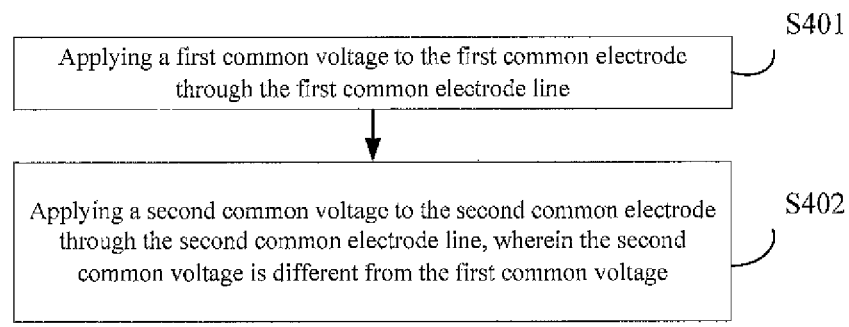
FIG. 15 is a flow chart illustrating a driving method of an exemplary array substrate as provided by a fifth embodiment of the present invention.

An embodiment of the present invention also provides a driving method of array substrate. As shown in FIG. 15, the method includes: step 401, applying a first common voltage to a first common electrode through a first common electrode line; step 402, applying a second common voltage to a second common electrode through a second common electrode line, wherein the second common voltage is different from the first common voltage.

Applying pixel voltage signal to a pixel electrode through a data line, wherein the pixel voltage signal is set between the first common voltage and the second common voltage.

In embodiments of the present invention, the first common electrode and the second common electrode have different polarities, that is, when a voltage of the first common electrode has a positive polarity, a voltage of the second common electrode has a negative polarity (vice versa). A voltage of the pixel electrode is set between the voltage of the first common electrode and the voltage of the second common electrode. For example, the voltage $V_{com1}$ of the first common electrode and the voltage $V_{com2}$ of the second common electrode have equal absolute values. The voltage of the first common electrode has a positive polarity, the voltage of the second common electrode has a negative polarity, the voltage $V_{pixel}$ of the pixel electrode is set between $V_{com1}$ and $V_{com2}$, and $V_{com1}=-V_{com2}$, $|V_{com1}-V_{pixel}|=|V_{pixel}-V_{com2}|$, $0.2V<V_{com1}<0.3V$, $-0.2V<V_{com2}<-0.3V$. The first common electrode and the second common electrode generate multi-dimensional electric fields with the pixel electrode respectively, so as to drive the LC molecules located over the pixel electrode to rotate sufficiently in the horizontal direction, which improves the transmittance.

Embodiments of the present invention provide an array substrate, a driving method of array substrate and a display device; the array substrate is provided with two common electrodes which are the first common electrode and the second common electrode; edges of the first and second common electrode generate a multi-dimensional electric field, the first common electrode and the second common electrode generate a multi-dimensional electric field, the first common electrode and the pixel electrode generate a multi-dimensional electric field, and the second common electrode and the pixel electrode generate a multi-dimensional electric field, these multi-dimensional electric fields are superposed together to facilitate driving the LC molecules located between the electrodes and directly over the electrodes, thereby improving the LC working efficiency and increasing the transmittance.

It is understood that the described above are just exemplary implementations and embodiments to explain the embodiments of the present invention, and they are not intended to limit the present invention. An ordinary person in the art can make various variations and modifications to the present invention without departure from the spirit and the scope of the present invention, and such variations and modifications shall fall in the scope of the present invention. The protection scope of the present invention is defined by the appended claims.

The present application claims the priority of Chinese patent application No. 201310467672.9 filed on Oct. 9, 2013, titled "ARRAY SUBSTRATE, DRIVING METHOD OF THE ARRAY SUBSTRATE AND DISPLAY DEVICE", which is entirely incorporated herein by reference.

What is claimed is:

1. An array substrate, comprising gate lines, data lines, and a plurality of pixel units defined by the gate lines and the data lines, each of the plurality pixel units comprising a common electrode and a pixel electrode,
wherein the common electrode and the pixel electrode are located at different film layers and are insulated from each other by an insulating layer; the common electrode comprises a first common electrode connected to a first common electrode line and a second common electrode connected to a second common electrode line; the first common electrode and the second common electrode are both slit electrode and comprise a plurality of first strip electrodes and a plurality of second strip electrodes respectively; the first strip electrodes are arranged alternately with the second strip electrodes, configured to form electrical fields with the pixel electrode respectively.

2. The array substrate according to claim 1, wherein the pixel electrode is a slit electrode and comprises a plurality of third strip electrodes; the third strip electrodes of the pixel electrode are arranged alternately with the first strip electrodes of the first common electrode and with the second strip electrodes of the second common electrode; the third strip electrodes of the pixel electrode are arranged alternatively between the first strip electrodes of the first common electrode and the second strip electrodes of the second common electrode that are adjacent to each other.

3. The array substrate according to claim 1, wherein the first common electrode and the second common electrode are located at a same film layer; the first common electrode and the second common electrode both are located at a side of the pixel electrode that is away from a substrate of the array substrate, or, the first common electrode and the second common electrode both are located at a side of the pixel electrode that faces the substrate of the array substrate.

4. The array substrate according to claim 1, wherein the first common electrode and the second common electrode are located at different film layers; the first common electrode and the second common electrode both are located at a side of the pixel electrode that is away from a substrate of the array substrate, or, the first common electrode and the second common electrode both are located at a side of the pixel electrode that faces the substrate of the array substrate, or, the first common electrode is located at a side of the pixel electrode that is away from a substrate of the array substrate and the second common electrode is located at a side of the pixel electrode that faces the substrate of the array substrate.

5. The array substrate according to claim 2, wherein a distance between projections of the first strip electrodes of the first common electrode and the second strip electrodes of the second common electrode on the substrate, which are adjacent to each other, is larger than a width of the third strip electrodes of the pixel electrode.

6. The array substrate according to claim 2, wherein a distance between the first strip electrodes of the first common electrode and the third strip electrodes of the pixel electrode in a direction parallel to the array substrate is 0~0.6 μm; a distance between the second strip electrodes of the second common electrode and the third strip electrodes of the pixel electrode in a direction parallel to the array substrate is 0~0.6 µm; and each of the first strip electrodes, the second strip electrodes and the third strip electrodes has a width of 2~2.6 µm.

7. The array substrate according to claim 1, wherein the pixel electrode is a plate electrode; the first common electrode and the second common electrode both are located at a same layer or different layers at a side of the pixel electrode that is away from a substrate of the array substrate.

8. A display device, comprising the array substrate of claim 1.

9. A method of driving the array substrate of claim 1, comprising:
applying a first common voltage to the first common electrode through the first common electrode line; and
applying a second common voltage to the second common electrode through the second common electrode line, wherein the second common voltage is different from the first common voltage; and
providing a pixel voltage signal to the pixel electrode through the data line, wherein the pixel voltage signal is set between the first common voltage and the second common voltage.

10. The array substrate according to claim 2, wherein the first common electrode and the second common electrode are located at a same film layer; the first common electrode and the second common electrode both are located at a side of the pixel electrode that is away from a substrate of the array substrate, or, the first common electrode and the second common electrode both are located at a side of the pixel electrode that faces the substrate of the array substrate.

11. The array substrate according to claim 2, wherein the first common electrode and the second common electrode are located at different film layers; the first common electrode and the second common electrode both are located at a side of the pixel electrode that is away from a substrate of the array substrate, or, the first common electrode and the second common electrode both are located at a side of the pixel electrode that faces the substrate of the array substrate, or, the first common electrode is located at a side of the pixel electrode that is away from a substrate of the array substrate and the second common electrode is located at a side of the pixel electrode that faces the substrate of the array substrate.

12. The array substrate according to claim 11, wherein the first common electrode and the second common electrode are located at different film layers; the first common electrode and the second common electrode both are located at a side of the pixel electrode that is away from a substrate of the array substrate, or, the first common electrode and the second common electrode both are located at a side of the pixel electrode that faces the substrate of the array substrate, or, the first common electrode is located at a side of the pixel electrode that is away from a substrate of the array substrate and the second common electrode is located at a side of the pixel electrode that faces the substrate of the array substrate.

13. The array substrate according to claim 3, wherein a distance between projections of the first strip electrodes of the first common electrode and the second strip electrodes of the second common electrode on the substrate, which are adjacent to each other, is larger than a width of the third strip electrodes of the pixel electrode.

14. The array substrate according to claim 4, wherein a distance between projections of the first strip electrodes of the first common electrode and the second strip electrodes of the second common electrode on the substrate, which are adjacent to each other, is larger than a width of the third strip electrodes of the pixel electrode.

15. The array substrate according to claim 12, wherein a distance between projections of the first strip electrodes of the first common electrode and the second strip electrodes of the second common electrode on the substrate, which are adjacent to each other, is larger than a width of the third strip electrodes of the pixel electrode.

16. The array substrate according to claim 3, wherein a distance between the first strip electrode of the first common electrode and the third strip electrode of the pixel electrode in a direction parallel to the array substrate is 0~0.6 µm; a distance between the second strip electrode of the second common electrode and the third strip electrode of the pixel electrode in a direction parallel to the array substrate is 0~0.6 µm; and each of the first strip electrodes, the second strip electrodes and the third strip electrodes has a width of 2~2.6 µm.

17. The array substrate according to claim 4, wherein a distance between the first strip electrode of the first common electrode and the third strip electrode of the pixel electrode in a direction parallel to the array substrate is 0~0.6 µm; a distance between the second strip electrode of the second common electrode and the third strip electrode of the pixel electrode in a direction parallel to the array substrate is 0~0.6 µm; and each of the first strip electrodes, the second strip electrodes and the third strip electrodes has a width of 2~2.6 µm.

18. The array substrate according to claim 5, wherein a distance between the first strip electrodes of the first common electrode and the third strip electrodes of the pixel electrode in a direction parallel to the array substrate is 0~0.6 µm; a distance between the second strip electrodes of the second common electrode and the third strip electrodes of the pixel electrode in a direction parallel to the array substrate is 0~0.6 µm; and each of the first strip electrodes, the second strip electrodes and the third strip electrodes has a width of 2~2.6 µm.

19. The array substrate according to claim 15, wherein a distance between the first strip electrodes of the first common electrode and the third strip electrodes of the pixel electrode in a direction parallel to the array substrate is 0~0.6 µm; a distance between the second strip electrodes of the second common electrode and the third strip electrodes of the pixel electrode in a direction parallel to the array substrate is 0~0.6 µm; and each of the first strip electrodes, the second strip electrodes and the third strip electrodes has a width of 2~2.6 µm.

* * * * *